United States Patent
Dwersteg

(10) Patent No.: US 9,030,150 B2
(45) Date of Patent: May 12, 2015

(54) METHOD AND CIRCUIT ARRANGEMENT FOR CONTROLLING CURRENT IN MOTORS

(75) Inventor: Bernhard Dwersteg, Hamburg (DE)

(73) Assignee: Trinamic Motion Control GmbH & Co. KG, Hamburg (DE)

( * ) Notice: Subject to any disclaimer, the term of this patent is extended or adjusted under 35 U.S.C. 154(b) by 152 days.

(21) Appl. No.: 13/509,801

(22) PCT Filed: Nov. 18, 2010

(86) PCT No.: PCT/DE2010/075140
§ 371 (c)(1),
(2), (4) Date: May 15, 2012

(87) PCT Pub. No.: WO2011/060783
PCT Pub. Date: May 26, 2011

(65) Prior Publication Data
US 2012/0274261 A1 Nov. 1, 2012

(30) Foreign Application Priority Data
Nov. 18, 2009 (DE) .......................... 10 2009 053 564

(51) Int. Cl.
*H02P 8/00* (2006.01)
*H03F 1/02* (2006.01)
*H02P 27/10* (2006.01)
*H02P 8/12* (2006.01)

(52) U.S. Cl.
CPC . *H02P 27/10* (2013.01); *H02P 8/12* (2013.01)

(58) Field of Classification Search
None
See application file for complete search history.

(56) References Cited

U.S. PATENT DOCUMENTS

| 4,682,092 A | | 7/1987 | Pellegrino et al. | |
|---|---|---|---|---|
| 5,625,269 A | * | 4/1997 | Ikeda | 318/696 |
| 6,664,754 B2 | * | 12/2003 | Misumi | 318/696 |
| 7,068,007 B2 | | 6/2006 | Silitonga | |
| 2003/0067280 A1 | * | 4/2003 | Wang et al. | 318/685 |
| 2006/0087276 A1 | * | 4/2006 | Silitonga | 318/685 |

(Continued)

FOREIGN PATENT DOCUMENTS

DE 203 05 771 U1 7/2003
DE 10 2008 026 669 A1 12/2009

(Continued)

OTHER PUBLICATIONS

Search Report from corresponding German Application 10 2009 053 564.0.

(Continued)

*Primary Examiner* — Paul Ip
*Assistant Examiner* — Devon Joseph
(74) *Attorney, Agent, or Firm* — WRB-IP LLP

(57) ABSTRACT

A method and circuit arrangement for controlling the motor current in an electric motor, in particular a stepper motor, by a chopper method is provided. In the method/circuit arrangement, the motor is operated with a coil current that follows a target coil current substantially more accurately at least at the zero crossing of the coil current. The method/circuit arrangement provides a good symmetry of the sinusoidal wave shape of the coil current with respect to the zero crossing of the coil current. The method is achieved in particular by the active control of the coil current both in the direction of a predefined target coil current and opposite the direction of the predefined target coil current with respect to upper or lower desired current values and a lowering or increasing of the upper or lower desired current values.

17 Claims, 5 Drawing Sheets

(56) References Cited

U.S. PATENT DOCUMENTS

| | | | |
|---|---|---|---|
| 2006/0244521 A1* | 11/2006 | Yoshida et al. | 330/9 |
| 2007/0040529 A1* | 2/2007 | Takebayashi et al. | 318/685 |
| 2008/0067969 A1* | 3/2008 | Fujinaka et al. | 318/696 |
| 2009/0206788 A1 | 8/2009 | Ando | |
| 2009/0230899 A1* | 9/2009 | Arimura et al. | 318/400.01 |
| 2010/0141199 A1* | 6/2010 | Shimada | 318/696 |
| 2011/0248660 A1* | 10/2011 | Lopez-Diaz et al. | 318/490 |
| 2012/0153886 A1* | 6/2012 | Dwersteg et al. | 318/696 |
| 2012/0169416 A1* | 7/2012 | Gupta et al. | 330/9 |
| 2012/0274261 A1* | 11/2012 | Dwersteg | 318/696 |

FOREIGN PATENT DOCUMENTS

| | | |
|---|---|---|
| JP | 61224899 A | 10/1986 |
| WO | 03030349 A1 | 10/1986 |

OTHER PUBLICATIONS

International Search Report from corresponding International Application PCT/DE2010/075140.

Ajay Tripathi et al: "Comparative Analysis of Fixed and Sinusoidal Band Hysteresis Current Controllers for Voltage Source Inverters", IEEE Transactions on Industrialelectronics, IEEE Service Center, Piscataway, NJ, US)\, Bd. 39, Nr. 1' , Feb. 1, 1992, pp. 63-73, XP000292464, ISSN: 0278-0046, DOI: DOI:10.1109/41.121913 pp. 63,65; Figs 2a,2b,3.

Bose B K: "An Adaptive Hysteresis-Band Current Control Technique of a Voltage-Fed Pwm Inverter for Machine Drive System", 19881024; 19881024-19881028, Bd. 3, Oct. 24, 1988, pp. 684-690, XP010271152.

* cited by examiner

METHOD AND CIRCUIT ARRANGEMENT FOR CONTROLLING CURRENT IN MOTORS

BACKGROUND AND SUMMARY

The invention relates to a method and circuit arrangement for controlling the motor current in an electric motor, in particular a stepper motor, by means of a chopper method.

It is known, using a chopper method, to generate from a supplied motor supply voltage the direction of current, level of current and shape of current (in microstep operation usually a sine shape or cosine shape) for each motor coil of a stepper motor to be memorized in each coil according to a corresponding specified current (target coil current) using PWM pulses in order to drive the rotor of the motor.

In doing so, three different coil current phases are differentiated that are activated by means of the chopper method:

During the ON phase, the coil current in a coil is actively driven through the coil in the momentarily specified polarity or, respectively, direction of the coil current so that the coil current amount increases relatively quickly and continuously (startup period). This means the coil current direction that is memorized by way of an ON phase corresponds to the momentary polarity or, respectively, direction of the coil current.

In case of a sine-shaped coil current the polarity of the coil current is positive in the first and second quadrants and negative in the third and fourth quadrants, for example.

In the fast decay (FD) phase, the coil current is reduced against the respective specified polarity of the coil current by reversing the polarity of the coil and feeding the coil current back into the current supply. The FD phase is used to reduce the coil current relatively quickly, especially in the phase of a decreasing coil current amount (i.e. during the second and fourth quadrant of a sine-shaped coil current) and to prevent an adulteration of the specified current, in particular due to the CEMF.

The third phase of the chopper operation is the recirculation phase or slow decay (SD) phase, in which the doll is not controlled actively but rather is short circuited or bridged so that the coil current only decreases gradually (i.e. slower than during the FD phases) due to the internal resistance of the coil and the CEMF.

This means the chopper activates, measures and combines these three chopper phases with regard to time by means of chopper switching signals (usually PWM signals) supplied by a motor driver circuit so that the actual coil current follows a specified current (target coil current) as contemporaneously and exactly as possible across its entire (e.g. sine-shaped) course, i.e. during the increasing and decreasing current phases, and in particular is not changed (much) by the counter induced voltage (counter CEMF) caused by the rotor in the motor coils. This requires that the actual coil current be suitably measured or determined.

Due to the inaccuracies affiliated with such measuring or determination processes as well as due to the customary scattering of the electric component properties of the motor driver circuits as well as the internal resistance and the inductivity of the motor coils, the actual course of the coil current is always at least somewhat different than the specified target course of the coil current. Other reasons for this furthermore is the more or less inaccurate capture of the coil current measuring values, which is due to practical compromises, such capture only being possible during the ON and FD phases for bridge foot point measuring, for example. In particular, however, the chopper principle,that is used, i.e. the way in which the ON, FD and SD phases are controlled based on the measuring values, always result in a certain deviation of the actual course of the coil current from the target course of the coil current. This is due to the discrete working frequency, which is limited due to practical and physical reasons, and thus also is due to the chopper frequency. It was found that such deviations, in particular in the area of the zero crossing of the actual coil current, can cause disadvantageous effects, for example by the motor making a louder running noise and displaying resonances and poorer positioning properties.

It is desirable to provide a method and circuit arrangement for controlling the motor current in an electric motor, in particular a stepper motor, by means of a chopper method, by means of which Method/circuit arrangement the actual course of a coil current, in particular in the area of its zero crossing, can be adapted to a specified target coil current course substantially more accurately and least to the extent that the above referenced disadvantageous effects are no longer perceptible or can be negligible for a specific application.

A method for controlling the motor current in an electric motor according to an aspect of the present invention is provided, in particular a stepper motor, by means of a chopper method, by means of which method a coil current is controlled by means of at least one of the motor coils (A,B) during a chopper phase in the direction of a first target current value that is larger or smaller by a specified amount than a momentary amount of a specified target coil current, whereby the chopper phase is completed when the value of the coil current reaches the first target current value and whereby the first target current value is approximated to the momentary amount of the specified target coil current during the chopper phase in a manner that ensures that the chopper phase is completed prior to the expiration of a predetermined maximum duration.

A circuit arrangement for controlling the motor current in an electric motor according to an aspect of the present invention comprises a chopper (CH) for triggering a motor driver circuit (DR), a comparator (K) for comparing the target current values with actual current values, whereby an output of the comparator (K) is connected to the chopper (CH) as well as a device, for generating the target current values.

The principle according to the an aspect of invention can be applied to 2 phase stepper motors as well as to 3 and multi-phase stepper motors.

Additional details, characteristics and advantages of the invention are described in the following description of preferred, exemplary embodiments based on the drawing. The following is shown:

DETAILED DESCRIPTION

First, the three coil current or chopper phases mentioned in the beginning as well as the problems that have been found in connection with these phases shall be explained in more detail. The three phases are indicated schematically in FIG. 1(A), FIG. 1(B) and, respectively, FIG. 1(C). These, three figures each show a bridge circuit comprised of a first through fourth switch Sw1, Sw2, Sw3, and Sw4, whereby a first and a second switch Sw1, Sw2 as well as a third and fourth switch Sw3, Sw4 are connected in series and the two series connections are connected in parallel. The motor coil L is connected to the centers of the bridge branches. The foot of the bridge circuit typically is connected to ground via a measuring resistance $R_s$, while the head of the bridge circuit is connected to a voltage or power supply U of the driver circuit.

Figure 1A:
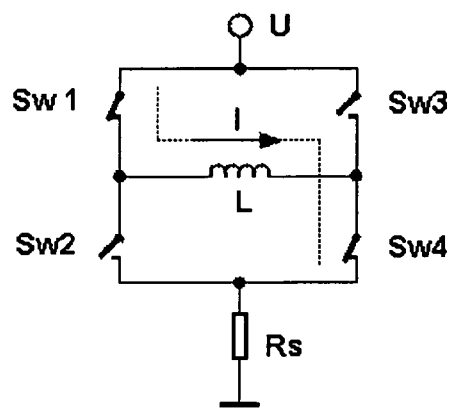
FIG. 1 shows circuit diagrams with different current directions in a motor coil during chopper operation.

FIG. 1(A) shows the switch positions and the resulting direction of the current flow I through the coil L during the above mentioned first or ON phase, in which this direction is the same one as the specified direction or polarity of the coil current, whereby the first and the fourth switches Sw1, Sw4 are closed and the second and third switches Sw2, Sw3 are open.

Figure 1B:
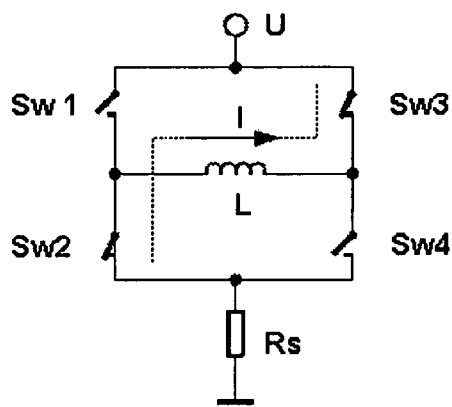

FIG. 1(B) shows the switch positions and the resulting reversal of the polarity of the coil L as well as the return feed of the coil current I into the voltage supply U, i.e. against the direction of the specified current or, respectively, polarity of the coil current during the above mentioned second or fast decay phase, in which the first and the fourth switches Sw1, Sw4 are open and the second and third switches Sw2, Sw3 are closed.

Figure 1C:
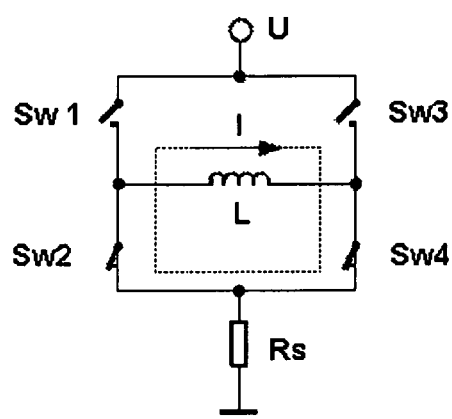

Finally FIG. 1(C) shows the third or slow decay phase (SD phase) in which the coil L is short circuited or bridged, i.e. the second and the fourth switches Sw2, Sw4 are closed while the first and the third switches Sw1, Sw3 are open (or correspondingly reverse) so that the current I that flows in the coil L gradually decreases in accordance with the internal resistance of the coil L, i.e. recirculates.

For reasons of convenience, a sine-shaped current trigger of the coils is assumed for the following considerations, i.e. in a 2 phase motor or stepper motor one of the coils is energized with a sine-shaped current and the other coil is energized with a cosine-shaped current. However, these considerations apply accordingly for non-sine-shaped triggering and/or 3 or multiple phase stepper motors in which the currents to be triggered have a different phase shift (e.g. 120°) in relation to one another.

Furthermore, for the following considerations a distinction is made between phases of increasing coil current amount (i.e. during the first and the third quadrants of the sine-shaped coil current) and phases of decreasing coil current amount (i.e. during the second and fourth quadrants of the sine-shaped coil current) in the coils L. Each of these current phases is divided and realized into a suitable number of ON, FD and, if necessary, SD phases by means of the, chopper method, so that the coil current follows the sine-shaped specified current as closely as possible.

Different algorithms are known with which the temporal duration of these three chopper phases and their succession can be set for the chopper method.

Figure 2A:
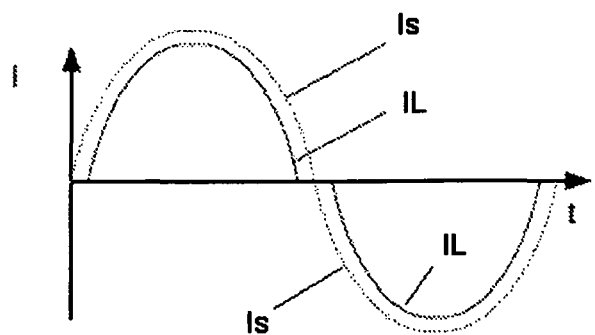
FIG. 2 shows different deviations of an actual coil current from a specified target coil current during a full current period.

While the ON phases generally are completed when a momentary actual amount of the coil current reaches a momentary target value of the coil current amount, the FD phases often are completed in an uncontrolled manner after a certain time period has expired, the goal being to guarantee the maximum required decrease of the coil current in the respective FD phase, which is required for the application based on empirical values, without actually measuring it. This method often results in a decrease of the actual coil current amount below the target coil current amount so that the result is a current course that is unfavorable for the motor, e.g. as is shown in FIG. 2(A). While this unfavorable coil current course can be compensated by means of an offset on the target coil current within certain limits, this often does not occur with the required degree of accuracy since the compensation is not measured or readjusted on a case by case basis. Optimally it would have to be adjusted, for example, to speed, supply voltage and temperature of the motor. Nonetheless, the actual coil current course IL often deviates from the target coil current course is despite such compensation.

Figure 2B:
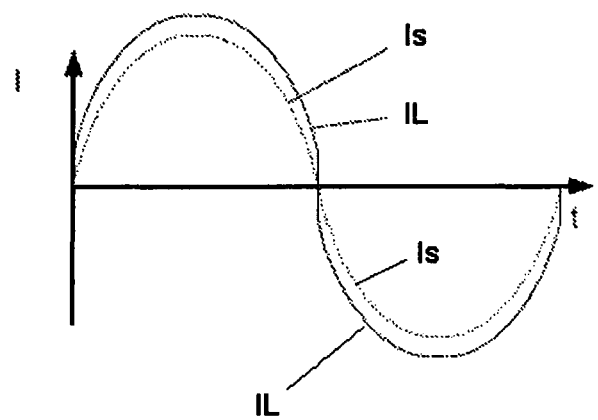

This error has a negative effect with successive positive and negative half sine waves of the coil current, in particular in the area of its zero crossing, as is shown in FIGS. 2(A) and 2(B), for example.

If the above explained error, which is caused by unadjusted FD phases, is not taken into consideration, the case indicated in FIG. 2(A) occurs, in which the amount of the actual coil current IL decreases on average by a certain value below the specified amount of the target coil current Is so that in case of a succession of positive and negative half waves of the coil current the result is a flattening or, as is shown in FIG. 2(A), a longer dwell time in the area of the zero crossing of the coil current.

If, on the other hand, the above mentioned error of the FD phases is overcompensated by means of an offset of the trigger threshold, the opposite case occurs, shown in FIG. 2(B), in which in each half wave of the actual coil current IL it is not completely decreased so that in case of a succession of positive and negative half waves in the area of the zero crossing a jump between the half waves occurs.

In order to be able to carry out a comparison between a momentary actual coil current amount and a momentary target value of the coil current amount, the momentary actual coil current usually is measured by means of a measuring resistance Rs (ref. FIG. 1) in the foot point of the bridge circuit via which the coil current is conducted through the respective coil (whereby the current can also be measured using different means, for example digitally using an A/D converter) and then is compared with the momentary target value of the coil current amount in a comparator. From a circuit point of view this arrangement has proven to be simple and robust, in particular with monolithic components. An important contribution with this type of capturing the coil current measuring value also is the blanking time that is adapted to the application and during which no measuring value is taken. After each change of a chopper phase (ON, FD, SD), this is the time that is waited so that current fluctuations caused by parasitic coil capacities and other effects can subside and a measuring amplifier can settle on a sufficiently accurate value.

In order to minimize the power dissipation in the measuring resistance Rs, it must be as low as possible. However, it was found that measuring the resulting low voltage decrease, especially when it is measured in the area of the zero crossing of the coil current, is relatively inaccurate and can be error-prone, since, a comparator typically has an offset. The internal resistance of the motor coils as well as their inductivity scatters depending on model and temperature so that an uncontrolled compensation of the offset often is not possible with the required degree of accuracy.

The result of the above explained chopper basic principle thus comprises inaccuracies in regard to a temporally optimum termination of the FD phases and thus causes the deviations of the actual coil current from a specified target coil current as explained above, in particular in the area of the zero crossing of the actual coil current.

Since in the area of the zero crossing of the current through a coil, only this coil determines the angle of rotation of the motor (in the respective other coil the angular point of the coil current is reached at this point in time in microstep operation), the motor overall is very sensitive to jumps or flattening of the coil current during zero crossing and displays, as mentioned above, louder running noise as well as resonances and poorer positioning properties.

According to the invention thus a method and a circuit arrangement is created by means of which method/circuit arrangement the motor is operated with a coil current that, at least in the zero crossing of the coil current, follows a target coil current substantially more accurate and which provides a good symmetry of the sine-shape of the coil current with regard to the zero crossing of the coil current.

One characteristic of the invention is that instead of the known FD phase, a reverse ON phase, hereinafter called ONr phase, is created that, just like a FD phase, is used to decrease the coil current amount, whose duration, however, similar to the description for the ON phases above, is controlled based on a deviation of a momentary actual value of the coil current from a momentary target value of the coil current. The ONr phase is maintained or is not completed until the momentary target current value is reached.

For reasons that will be explained below, the target current value to which the actual coil current is controlled during the ONr phase (hereinafter called "lower" target current value) preferably does not correspond exactly to the momentary target value of the specified coil current (i.e., for example, the instantaneous value of the specified sine-shaped course of the current), but rather its amount is smaller.

Preferably the actual coil current is controlled to a target current value during the ON phase (hereinafter called "upper" target current value), whose amount is higher than the momentary target value of the coil current.

These two amounts (hereinafter called hysteresis) could be different, however, preferably are at least substantially equal so that the lower and the upper target current value deviate up or down by the same amount from the momentary target value of the coil current.

The entire course of the actual coil current thus is controlled alternately between an upper and a lower target current value so that the actual coil current moves within a window or range that is limited by the upper and lower target current values. In the process the resulting, mean actual coil current course does not deviate or only deviates somewhat from the specified target coil current course (i.e. for example, the sine-shape). In this manner in particular any flattening or jumps in the area of the zero crossing of the coil current can be avoided.

In other words, the so-called window (range) is determined such that the result is a mean, actual coil current course (which is within the window) that does not deviate from or only deviates slightly from the specified target coil current course.

In order to stabilize the timing or to limit the chopper frequency upward preferably between one ON phase (also called first phase) and a subsequent ONr phase (also called second phase) as well as preferably between one ONr phase and a subsequent ON phase, a SD phase with a duration that is suitable for this purpose (i.e. in particular application dependent) is inserted.

The SD phases preferably have a predetermined, constant temporal duration that is suitably preset for limiting the chopper cycle frequency in particular upward or even downward. However, the duration can be increased and/or decreased during the chopper method based on certain operating conditions or in order to the frequency limitation that was mentioned.

Chopper frequency (or chopper cycle frequency) in this application is the repetition frequency of the chopper cycles which is formed by a succession of the phases ON-SD-ONr-SD (hereinafter called chopper cycle) (in particular with constant upper and lower target current value). Using this chopper cycle frequency, the coil current thus changes cyclically between the upper and the lower target current value. In general, this frequency should be outside the audible range (>20 kHz) so it cannot be heard, on the other hand, however, it should not be too much above this range in order to minimize magnetic reversal losses in the motor and switching losses in the motor driving circuit.

Figure 3:
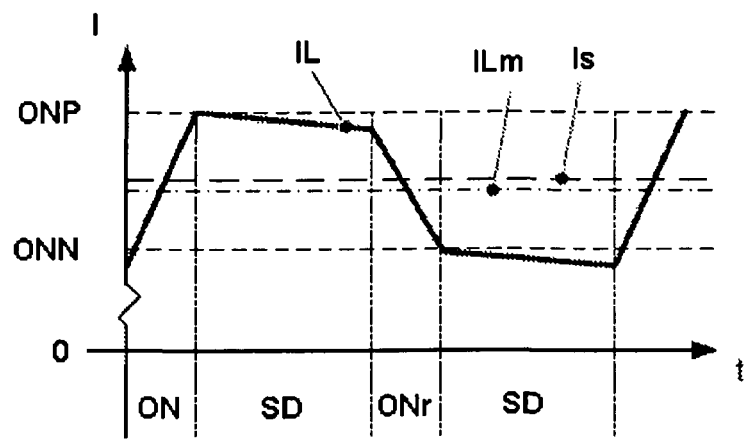
FIG. 3 shows a first diagram of part of the course of an actual coil current with a chopper method with constant hysteresis.

FIG. 3 shows a short period of time of a coil current period of the actual coil current IL that results from the above described succession of the ON-SD-ONr-SD phases. In the process the actual coil current IL is controlled to an upper target current value ONP during the ON phase and then the amount drops slightly during the subsequent SD phase. With the beginning of the ONr phase the actual coil current IL then is controlled to a lower target current value ONN and then the amount drops slightly more during the subsequent SD phase. Finally, FIG. 3 also shows the mean actual coil current ILm resulting during this chopper cycle compared to the specified target coil current Is.

Figure 4:
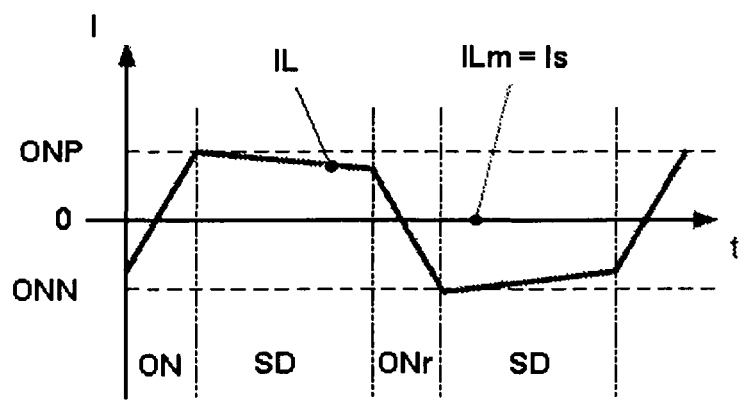
FIG. 4 shows a second diagram of part of the course of an actual coil current with a chopper method with constant hysteresis in the area of a zero crossing of the target coil current.

FIG. 4 shows these current courses for a short period of time from a coil current period in the area of its zero crossing. This presentation shows that the current courses are completely symmetrical during a chopper cycle (ON-SD-ONr-SD) in the area of the zero crossing so that the mean actual coil current ILm in this area corresponds exactly to the specified target coil current Is.

The capture of the actual coil current IL preferably occurs by means of a measuring resistance Rs in the foot point of the bridge circuit by means of which the coil current IL is guided through the respective motor coil (or by different, known means) as well as by means of a comparator for comparing the actual coil current IL with the respective upper and lower target current value ONP, ONN.

Since such a comparator thus works bi-directionally, an offset of the comparator only results in an asymmetry between the positive and the negative peak value of the actual coil current period but not in a jump or flattening of the coil current in the area of its zero crossing. Due to the pole reversal of the comparator between an ON and an ONr phase during each chopper cycle, a possible asymmetry can, even be compensated in the area of a chopper cycle.

The upper and lower target current values ONP, ONN preferably are generated by increasing or decreasing the supplied momentary target values of the coil current Is by the first or second amount (which preferably, as explained above, are equal) before they are supplied to a comparator for a comparison with the captured momentary actual coil current value.

In the alternative or in addition, the upper and lower target current values ONP, ONN can be generated by wiring the comparator in a manner that ensures that it has a corresponding hysteresis when comparing the above current values.

In both cases the first and second amounts (hereinafter both called "hysteresis") are at least such that the inaccuracies of the comparator and the dead times do not result in an inaccurate tracking of the actual coil current compared to the target coil current and thus in instabilities of the control when the coil current values are captured (blanking of the comparator). This means that the hysteresis must have at least a certain minimum value that is such that the upper or lower target current values are reached under any circumstances within the blank time of the comparator (a few microseconds that are required to be able to capture the coil current value correctly again after a change in the chopper phase occurs).

The chopper cycle frequency is the result of the (preferably fixed, prior selected and thus constant) duration of the SD phases plus the duration of the ON and the ONr phase, which result from the coil inductivity, the current hysteresis as well as the supply voltage (less the counter CEMF and ohm losses $R*I$).

If, however, the supply voltage U of the circuit, for example, is only slightly above or below the voltage that is required at a minimum for controlling the coil current IL to the upper or, respectively, lower target current values and the ON phases or ONr phases thus must become relatively long until the coil current IL reaches the specified upper or, respectively, lower target current values, there is a chance that the chopper cycles (ON-SD-ONr-SD) overall become relatively long and the chopper cycle frequency thus decreases to a point to where it reaches the audible range. Furthermore, this frequency can also decrease correspondingly with high motor inductivity.

Such a lowering can be mitigated or eliminated by selecting a low first and second amount (hysteresis) mentioned above, thus making the target current values only slightly above or below the target coil current value Is.

To ensure that the chopper cycle frequency always stays above the audible range, a very small hysteresis would have to be selected or set. However, this in turn can result in the above explained chance of a loose tracking of the actual coil current. Furthermore, a very low hysteresis would have high demands on the accuracy and velocity as well as the symmetry of the comparator between negative and positive measuring values and would require components with very low tolerances, which would be associated with corresponding disadvantages from a cost point of view.

If this means that no optimal value can be found for the hysteresis with which both above mentioned problems can be resolved satisfactorily, then preferably a variable hysteresis is introduced for at least one of the two chopper phases ON and ONr. If the variable hysteresis is realized for one of the two chopper phases only, the other of the two chopper phases can have a fixed, i.e. constant hysteresis as described above. Furthermore, the ONr phase may be a known FD phase in case only the ON phase is realized with the variable hysteresis. The selection of these variations and the determination of the hysteresis are based on the application in that the above mentioned requirements are fulfilled or good symmetry of the course of the actual coil current IL in relation to the target coil current Is isgg reached.

Additionally, or alternatively, it is possible, in principle, to set or shorten the SD phases for reaching these goals. However, since the SD phases, as mentioned above, preferably are used to limit the upper limit of the chopper cycle frequency and thus must have a certain constant minimum temporal length for this purpose, the SD phase is not shortened, if possible.

In order to realize the variable hysteresis, first a relatively high value of the hysteresis is set at the beginning of each ON phase and/or ONr phase as a specified starting value, which does not allow the above last mentioned problems of an hysteresis that is too low (loose tracking of the actual coil current etc). To prevent the temporal duration of the ON phase or the ONr phase from being too long under the above mentioned or other conditions and the frequency of the chopper cycles thus from decreasing to a certain degree or falling below a certain value or becoming audible, the hysteresis is reduced from the beginning of each chopper cycle (i.e. during each ON and/or each ONr phase of each chopper cycle) from the starting value to a maximum of a specified lower value (final value), which can also be zero or near zero.

If the specified lower value of the hysteresis is reached in the process, it remains constant until the ON or ONr phase is completed. Conversely, the ON or ONr phase is completed if the actual coil current value reaches the (hysteresis-dependent) target current value, even if the hysteresis has not yet reached its lower value (which corresponds to the second target current value, ref. below) at this point in time.

In other words this means that during each identical chopper cycle during each ON phase, the upper target current value ONP is approximated to the momentary target value of the coil current Is and/or during each ONr phase the lower target current value ONN is approximated to the momentary target value of the coil current Is to ensure that the respective chopper phase and thus the respective chopper cycle is completed within a tolerable maximum duration and this duration is not exceeded because, for example, the supply voltage is relatively low at the time. This also prevents the chopper cycle frequency from dropping too much, or from falling below a desired lower value. For this purpose a suitable speed and/or amount of approximation can be selected.

Figure 5:
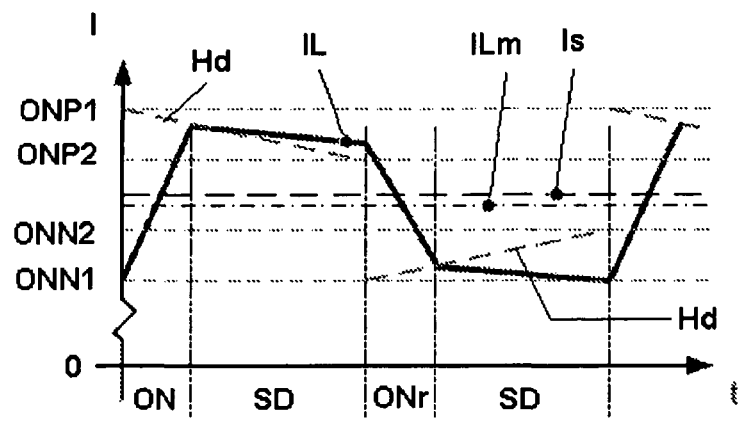
FIG. 5 shows a third diagram of part of the course of an actual coil current with a chopper method with variable hysteresis.

FIG. 5 shows the resulting current courses and target current values for an ON and an ONr phase for a chopper cycle. The specified (high) starting value of the hysteresis corresponds to a first upper or, respectively, a first lower target current value ONP1, ONN1, whose distance, based on amount, from the momentary value of the specified target coil current preferably is equal. The specified maximum lower value or final value of the hysteresis corresponds to a second upper or, respectively, a second lower target current value ONP2, ONN2, each having a smaller distance from the momentary target value of the coil current Is than the first upper or, respectively, first lower target current value ONP1, ONN1, whereby this amount of the distance also preferably is equal.

Furthermore, the dashed lines Hd indicate the resulting decrease or, respectively, increase (i.e. approximation) of the first upper or, respectively, first lower target current value in the direction of the respective second upper or, respectively, the second lower target current value that result from decreasing the hysteresis, whereby this decrease or, respectively, increase occurs during each individual chopper cycle and is repeated with each chopper cycle. The gradient or, respectively, speed of the decrease or, respectively, increase (the amounts of which preferably are equal) can be accomplished by setting the frequency and/or size of the decrementation, which preferably occurs in discrete steps. Alternatively, an analog, continuous approach for reducing the hysteresis is possible.

This means that decreasing or, respectively, increasing the first target current value ONP1, ONN1 in the direction of the second target current values ONP2 or, respectively ONN2, and thus in the direction of the momentary value of the specified target coil current means that the target current values move towards the respective actual coil current IL thus preventing the ON or, respectively, the ONr phase from becoming too long because the actual coil current IL only increases slowly due to certain operating conditions (low supply voltage etc). This counteracts a decrease of the chopper cycle frequency to an audible range. At the same time, it is not possible, due to the variable hysteresis, for the second target current values ONP2 and ONN2 to be reached already during the comparator blanking time, which would result in a tracking of the current that would be too loose.

In this context it should be mentioned that the approximation of the first target current value to the momentary value of the specified target coil current is at least substantially linear for reasons of easy realization, even if, of course, a non-linear approximation would be possible.

Finally the mean coil current ILm that results from the actual coil current course IL also is indicated in FIG. 5, which in this case (i.e. for momentary target values of the coil current that are not in the area of the zero crossing) again is a little below the specified target coil current course Is.

In the area of the zero crossing, again analog to FIG. 4, especially when the variable hysteresis for the ON and the ONr phase is realized, the current courses are completely symmetrical during a chopper cycle (ON-SD-ONr-SD) so that the mean actual coil current ILm corresponds exactly to the specified target coil current Is in this area.

It should be noted that the decrease or, respectively, increase of the first target current values ONP1, ONN1 in the direction of the second target current values ONP2, ONN2 as a rule also can extend over a plurality of successive chopper cycles (i.e. ON or, respectively, ONr phases) so that during an ON (or, respectively, ONr) phase the hysteresis is constant and is not decreased until in the next ON (or, respectively, ONR [sic]) phase so that the second target current values ONP2, ONN2 may not be reached until a plurality of chopper cycles before the hysteresis is reset to its (high) starting value at the beginning of the then following next ON or, respectively, ONr phase.

The high starting value and the low end value of the variable hysteresis as well as the speed of the decrease is selected such that the above mentioned problems (loose tracking of the actual coil current etc. or, respectively, the frequency of the chopper cycles that is too low etc.) do not occur.

Figure 6:
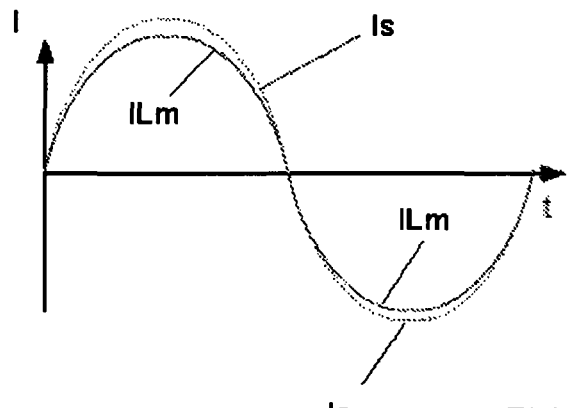
FIG. 6 shows a presentation of an actual and a specified (target) coil current course over an entire current period while applying the method according to the invention and FIG. 7 shows a principle circuit diagram in a stepper motor trigger unit with the components that are essential for carrying out the method according to the invention for one of the coils of the stepper motor.

FIG. 6 shows the mean coil current course ILm over an entire coil current period that can be achieved with the method in accordance with the invention compared to a specified sine-shaped target coil current course Is. This Figure shows that neither has any substantial deviation from each other and in particular neither displays any asymmetry in the area of the zero crossing and slight scaling deviations only occur in the angular points.

Figure 7:
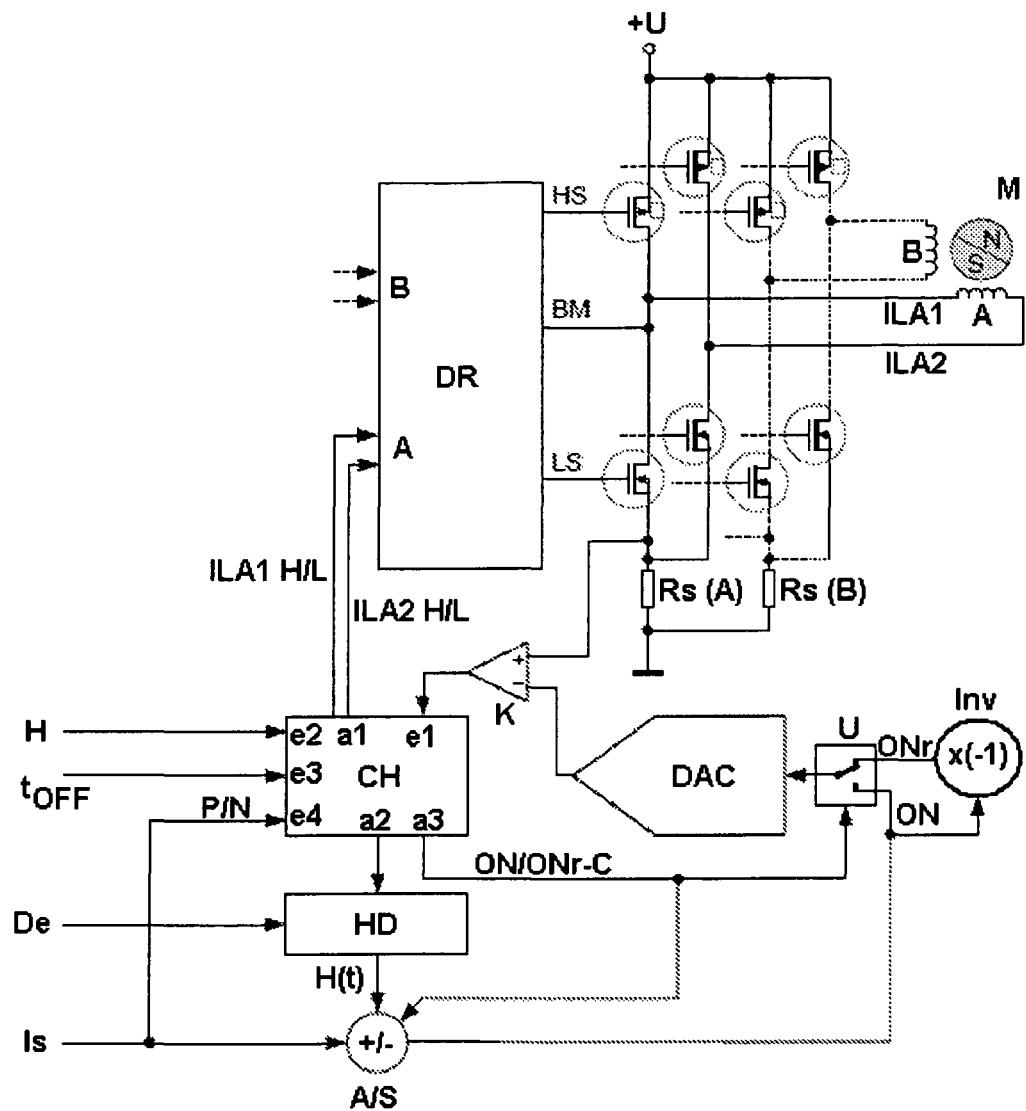

FIG. 7 finally shows a block wiring diagram of a circuit arrangement for carrying out the method according to the invention. This circuit arrangement comprises components of a motor driver circuit DR that is known per se, with which one of the two bridge circuits is triggered via outputs HS (High Side), LS (Low Side) and BM (bridge center) and with which one of the two coils A; B of the, in this case, 2 phase motor M is supplied with current. However, the method according to the invention can be used accordingly with a 3 or multiple phase motor with a corresponding higher number of motor coils in which the coil currents are memorized as explained above using a chopper method according to the invention.

The components of the circuit arrangement described below with which the driver circuit DR is triggered via inputs A, are shown only for one of the two coils (i.e. coil A) of the stepper motor M. These components thus are to be realized one more time for the other motor coil B (and for each additional motor coil, if any) and must be connected to corresponding inputs B etc. of the driver circuit DR.

As already explained above, the actual current IL that flows through a coil A of the motor M preferably is captured by means of a measuring resistance Rs(A) in the foot point of the bridge circuit by means of which the respective coil A is supplied with current.

The motor coil A, as mentioned above, only is triggered actively during the ON and/or the ONr phases, i.e. during the ON phase with a current ILA1 in the direction of the specified (i.e. target) coil current direction and during the ONr phase with a current ILA2 in the respective opposite direction. This, just like all of the following explanations, applies accordingly time-delayed to the other motor coil B as well.

In order to drive the current courses IL shown in FIGS. 3 through 5 through coil A, the PWM pulses ILA1 H/L, ILA2 H/L that are generated by a chopper CH for two directions of the coil currents IAL1, ILA2, are supplied to the driver circuit DR.

The positive or, respectively, negative voltage that, depending on the direction of the coil currents ILA1, ILA2, decreases on the measuring resistance Rs(A), is supplied to a first input of a comparator K to whose second input the output of a digital/analog converter DAC is applied with which the upper and lower target current values preferably generated on the digital level, are converted to analog values (the target current values can also be generated by means of analog signal processing, in this case the digital/analog converter DAC of course is not necessary). The chopper CH then generates on a first output a1 based on the output signal of the comparator K the PWM pulses ILA1 H/L, ILA2 H/L that are supplied to the driver circuit DR in a manner that ensures that the actual coil current course IL is achieved in accordance with the above description.

Alternatively and analog to the described capture by means of a comparator K the coil current can also be captured by means of an ADC (analog/digital converter) in order to carry out signal processing entirely on the digital level.

In addition to a first input e1 for the output signal of the comparator K the chopper CH comprises a second input e2 for setting the starting value of the hysteresis H (and thus the first target current values ONP1, ONN1), a third input e3 for setting a $t_{off}$ time of the chopper and a fourth input e4 for the given momentary direction (polarity) P/N of the target coil current Is by means of coil A.

A starting, value (high value) of the hysteresis H is applied to a second output a2 of the chopper CH with the required polarity while a switch signal ON/ONr-C for switching between the ON phase and the ONr phase is provided to a third output a3.

The circuit arrangement further comprises a device for generating the target current values in form of a hysteresis decrementer HD for decrementing the starting value of the hysteresis H (according to the first target current values) at the time, as explained above, of the beginning of each ON (and/or ONr) phase. For this purpose, a first input of the decrementer HD is connected to the second output a2 of chopper CH. The speed and the final value of the hysteresis decrement De can be set based on the chopper cycle frequency, for example, via a second input of the decrementer HD. The increase of the hysteresis change Hd and (ref below) the second target current values result from these values.

The circuit arrangement furthermore comprises an adder/subtractor A/S by means of which a supplied momentary (digital) target value of the coil current Is is charged with the current (i.e. decremented) hysteresis H(t). In doing so and based on the switching signal ON/ONr-C the momentary hysteresis H(t) is added to the target coil current value or is subtracted from it so that a momentary second upper or, respectively, lower target current value, i.e. a target current value that is approximated to the specified target current value develops for the ON or, respectively, the ONr phase.

These momentary second upper and lower target current values then are supplied to a first input of a converter U as well as by means of an inverter Inv to a second input of the converter U on whose output the input of the digital/analog converter DAC is applied in order to generate the momentary analog upper and lower target current values that are supplied to the second input of the comparator K for comparison with the measured momentary coil current values IL.

Converter U is switched between the ON phase and the ONr phase by means of the switch signal ON/ONr-C that is applied to the third output a3 of the chopper CH according to the current phase. This means that during an ONr phase the supplied target current values are inverted in regard to the ON phase so that the polarity of these target current values corresponds to the polarity of the latest current signal on measuring resistance Rs (A) which—due to the measuring in the foot point of the bridge circuit shown here—also is inverted in the ONr phase in relation to the ON phase.

The value of the hysteresis, i.e. its starting value (and thus the first target current value/s) can be set individually by the user by means of the second input e2 of the chopper CH. This also concerns the speed which can be set by means of the second input of the decrementer HD with which the starting value of the hysteresis is reduced or respectively, the end value of the decrementation De (which corresponds to the second target current value/s). On the other hand it also is possible to set these values automatically depending on the momentary value of the chopper frequency, the value of the supply voltage, etc. so that the above described problems are avoided.

The second target current values ONP2, ONN2, i.e. the minimally possible hysteresis preferably are/is the same in each chopper cycle. This end value of the hysteresis can be near or can be zero so that the second target current values ONP2, ONN2 are correspondingly close to the value of the specified target coil current or can be equal to it.

To the extent the above described decrease of the hysteresis is not necessary, for example because the audibility of the chopper frequency is not relevant, there is no decrementation. This means the user can set it to a fixed value, i.e. a value that is not decreased, if the value already takes the operating conditions into account to the extent that is desired.

The invention claimed is:

1. A method for controlling motor current in an electric motor having one or more motor coils in which each coil current period is divided and realized into a number of chopper phases by a chopper method in accordance with a predetermined coil current, comprising
controlling the actual coil current of at least one of the motor coils during a chopper phase in a direction of a first target current value that is larger or smaller by a predetermined amount than a momentary amount of the predetermined coil current, wherein the chopper phase is completed when a value of the actual coil current reaches the first target current value,
wherein the chopper phase is at least one of
an ON phase during which the actual coil current is controlled in the direction of a polarity of the predetermined coil current to the first target current value, wherein the first target current value is a first upper target current value (ONP1), which is generated by increasing the momentary value of the predetermined coil current in the direction of its polarity by a predetermined first amount, wherein the first upper taruet current value is approximated during each ON phase to the momentary value of the predetermined coil current in a manner that ensures that the chopper phase is completed prior to expiration of a predetermined maximum duration, and
an ONr phase during which the actual coil current is controlled against the direction of the polarity of the predetermined coil current to the first target current value, wherein the first target current value is a first lower target current value (ONN1), which is generated by increasing the momentary value of the predetermined coil current in the direction opposite to its polarity, wherein the first lower target current value is approximated during each ONr phase to the momentary value of the predetermined coil current in a manner that ensures that the chopper phase is completed prior to expiration of the predetermined maximum duration.

2. The method according to claim 1, wherein the actual coil current alternately is controlled by the ON and the ONr phases.

3. The method according to claims 1, wherein the predetermined first amount by which the first upper target current value is larger than the momentary value of the predetermined coil current in the direction of its polarity, and the predetermined second amount by which the first lower target current value is larger than the momentary value of the predetermined coil current in the direction opposite to its polarity are at least substantially equal.

4. The method according to claim 1, wherein the approximations of the first upper target current value and the first lower target current value to the momentary value of the predetermined coil current each have an at least substantially equal speed and/or each an at least substantially equal amount.

5. The method according to claim 1, wherein a SD phase is activated after completion of the chopper phase during which SD phase the motor coil substantially is short circuited, wherein the SD phase either has such a predetermined constant temporal duration or the duration is changed such that a chopper cycle frequency is within a predetermined range.

6. The method according to claim 1, wherein the approximation of the first upper target current value and the first lower target current value to the momentary value of the predetermined coil current is at least chronologically linear.

7. the method according to claim 1, in which the speed and/or the amount of the approximation of the first upper target current value and the first lower target current value to the momentary value of the predetermined coil current is such that a chopper cycle frequency does not decrease below a predetermined value even with low motor supply voltage and/or high motor inductivity.

8. The method according to claim 1, wherein the first upper target current value and the first lower target current value are generated by adding to or, respectively, subtracting from a momentary value of the predetermined coil current a current amount that corresponds to the predetermined first amount and the predetermined second amount, respectively.

9. The method according to claim 8, wherein the first upper target current value and the first lower target current value are approximated to the momentary value of the predetermined coil current during the ON phase and the ONr phase, respectively, by reducing the added or, respectively, reducing the subtracted current amount.

10. The method according to claim 1, wherein a maximum approximation of at least one of the first upper target current value and the first lower target current value to the momentary value of the predetermined coil current is defined by a second upper target current value and a second lower target current value, respectively, which are each closer to the momentary value of the predetermined, coil current than the first upper target current value and the first lower target current value, respectively, or are equal to it.

11. circuit arrangement for controlling the motor current in an electric motor having one or more motor coils, in which each coil current period is divided and realized into a number of chopper phases by a chopper method in accordance with a predetermined coil current, the circuit arrangement comprising a chopper with a first output for triggering a motor driver circuit in dependence on an output signal of a comparator, wherein the comparator is provided for comparing a first tipper target current value and a first lower target current value with actual coil current values, wherein an output of the comparator is connected to a first input of the chopper, and a device for generating the first upper target current value and the first lower target current value such that during at least one of an ON phase during which the actual coil current is controlled in the direction of a polarity of the predetermined coil current the first upper target current value (ONP1), which is generated by increasing the momentary value of the predetermined coil current in the direction of its polarity by a predetermined first amount, the first upper target current value is approximated to the momentary value of the predetermined coil current, and an ONr phase during which the actual coil current is controlled against the direction of the polarity of the predetermined coil current to the first lower target current value (ONN1), which is generated by increasing the momentary value of the predetermined coil current in the direction opposite to its polarity by a predetermined second amount, the first lower target current value is approximated to the momentary value of the predetermined coil current.

12. The circuit arrangement according to claim 11, wherein the device for generating the first upper target current value and the first lower target current value comprises a decrementer for decrementing at least one of the first and second predetermined amount, and an adder/subtractor for increasing and decreasing, respectively, the momentary amount of the predetermined coil current by the decremented predetermined first amount during each ON phase and by the decremented predetermined second amount during each ONr phase.

13. The circuit arrangement according to claim 12, wherein the chopper comprises a third output which is connected with the adder/subtractor and at which a switch signal is applied for switching between an ON phase and an ONr phase, in order to increase and decrease, respectively, the momentary amount of the predetermined coil current by the decremented predetermined first and second amount, respectively, in dependence on the switch signal.

14. The circuit arrangement according to claim 11, wherein the device for generating the first upper target current value and the first lower target current value is provided by wiring the comparator in a manner that ensures that it has a corresponding, hysteresis when comparing the first upper target current value and the first lower target current value with the actual coil current values.

15. The circuit arrangement according to claim 11, wherein the first upper target current value and the first lower target current value are generated on the digital level and are supplied to a digital/analog converter for generating analog input signals for the comparator.

16. The circuit arrangement according to claim 12, wherein the decrementer comprises a first input for the predetermined first amount and/or the predetermined second amount, and a second input for controlling the speed and/or the final value of decrementing the predetermined first amount and the predetermined second amount, respectively.

17. The circuit arrangement according to claim 16, wherein the chopper comprises a second input for controlling the first upper target current value and the first lower target current value, and a second output for the predetermined first amount and/or the predetermined second amount, wherein the second output is connected with the first input of the decrementer.

* * * * *